Patented Mar. 12, 1935

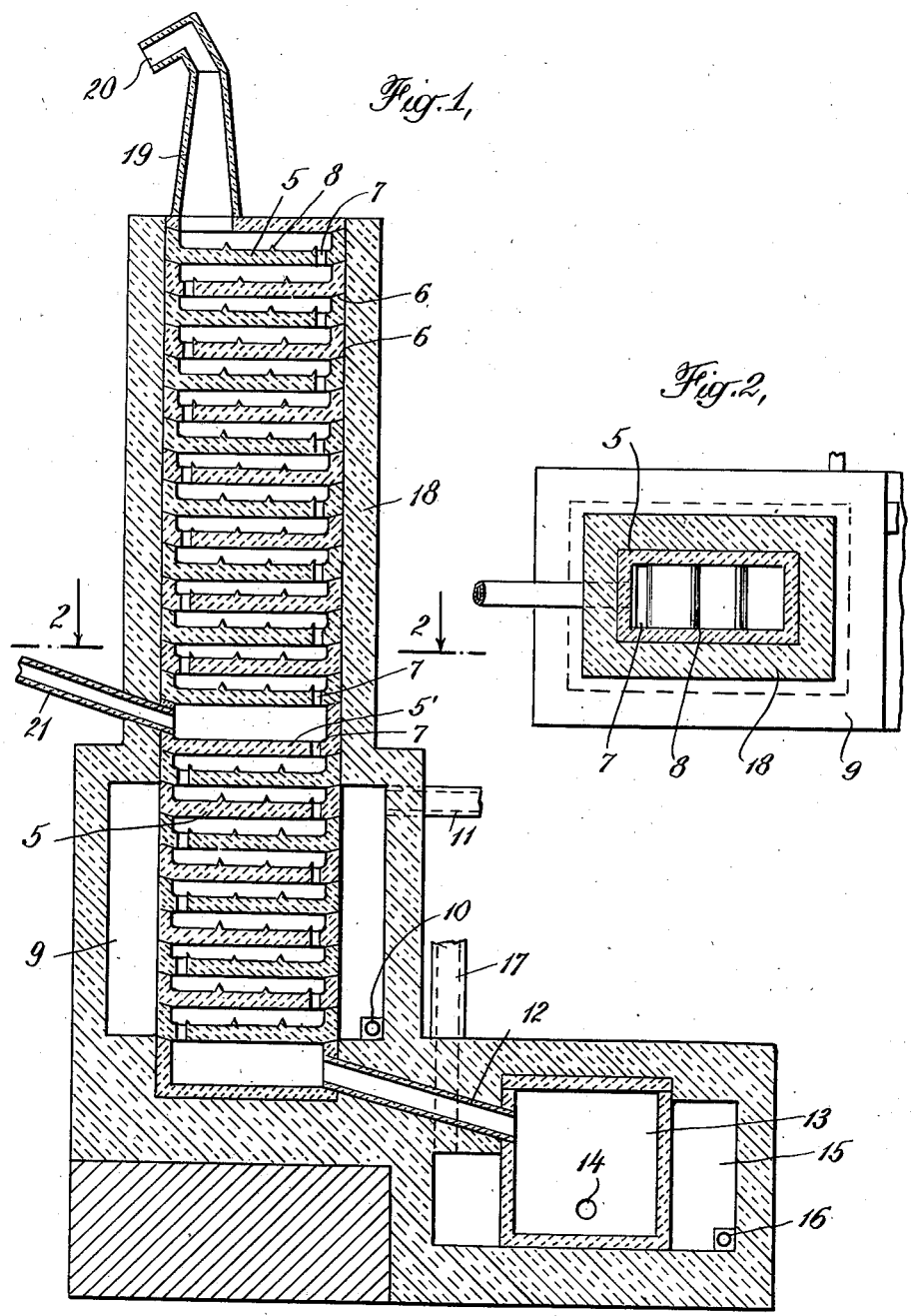

1,994,350

UNITED STATES PATENT OFFICE 1,994,350

APPARATUS FOR PURIFYING ZINC METAL

Philip McLean Ginder, Willis McGerald Peirce, and Robert Kerr Waring, Palmerton, Pa., assignors to The New Jersey Zinc Company, New York, N. Y., a corporation of New Jersey Original application July 2, 1932, Serial No. 620,634. Divided and this application January 31, 1934, Serial No. 709,096

10 Claims. (Cl. 266—19)

This invention relates to purifying zinc metal and has for its object the provision of an improved apparatus for that purpose. The apparatus of the invention is particularly adapted for carrying out the purification of zinc metal contaminated with a metal whose boiling temperature is lower than that of zinc (such as cadmium) by the method described and claimed in our copending patent application, Serial No. 620,634, filed July 2, 1932; the present application being divided therefrom. The apparatus of the invention is also adapted for carrying out the purification of zinc metal contaminated with a metal whose boiling temperature is higher than that of zinc (such as lead) by the method described in the patent application of Messrs. Holstein and Ginder, Serial No. 540,566, filed May 28, 1931. In each of these methods of purifying zinc metal, use is made of a reflux or rectifying column, and the apparatus of the invention is an improved reflux or rectifying column particularly adapted for use in these methods of purifying zinc metal.

The invention is best described by reference to the accompanying drawing in which, Fig. 1 is a sectional elevation of an apparatus embodying the principles of the invention, and Fig. 2 is a transverse section on the section line 2—2 of Fig. 1.

The apparatus of the invention consists of a column of vertically spaced transverse baffles having openings therein to permit the flow of metal vapor upwardly through the column and the passage of molten metal downwardly from baffle to baffle. In the apparatus shown in the drawing, the transverse baffles 5 are rectangular in shape and are built in the form of shallow trays and are supported one above another at their peripheries and are vertically spaced from one another over the greater portion of their horizontal surfaces. These baffles or trays may be made of silicon carbide or other appropriate refractory material. The top and bottom peripheral edges of the trays are bevelled as at 6 so that they may be stacked one above the other to form the column. The joints between the trays are made zinc-vapor-tight by an appropriate cement, such as a cement of silicon carbide with a small amount of clay. The bottom of each tray has a transverse opening 7 approximate one end thereof. The upper surface of each tray is provided with transverse ribs 8 substantially parallel to the opening 7; the ribs being of progressively increasing height, with the lowest rib nearest the opening in the baffle. The trays 5 are stacked in staggered relationship with respect to the openings 7 so that they form a column of superposed baffles through which metal vapor ascends and molten metal descends in tortuous or zig-zag paths. The ribs 8 serve to retain shallow pools of molten metal on the trays. The cascade effect of molten metal pouring over the ribs and falling from tray to tray facilitates intimate contact between ascending vapor and descending molten metal. It will be apparent from the drawing that the openings 7 are adapted to permit the continuous flow of metal vapor upwardly through the column and the passage of molten metal downwardly from baffle to baffle.

The built-up column (5) formed by the superimposed trays is surrounded by heat insulation in appropriate amount to insure the contemplated purification by rectification of the zinc metal. Where the apparatus is to be used for eliminating cadmium or the like from zinc metal in accordance with the method of our aforementioned application, the lower part of the column is surrounded for an appropriate length thereof by a combustion chamber or heating laboratory 9 provided with a gas burner 10 and a flue 11 for the escape of exhaust combustion gases. The base or lower end of the column 5 communicates through a conduit 12 with a molten metal sump 13, provided with a tap hole 14 and externally heated by a combustion chamber 15 having a burner 16 and a stack 17 for the escape of exhaust combustion gases.

Above the combustion chamber 9, the rectifying column 5 is surrounded by an appropriate layer of heat-insulating material 18. The relative lengths of the column 5 surrounded by the combustion chamber 9 and by the heat insulation 18, respectively, may be varied to meet different operating conditions encountered in practice.

The rectifying column 5 is surmounted by a cone 19 of silicon dephlegmator in the form of a cone 19 of silicon carbide or other material of good heat conductivity and inert to zinc and cadmium vapors. The upper portion of the cone 19 is connected through a pipe 20 to an appropriate collecting device (not shown) for the uncondensed portion of the metal vapor withdrawn from the top of the rectifying column.

In the apparatus illustrated in the drawing, the zinc metal to be purified is supplied in the form of vapor or molten metal to the rectifying column at a point intermediate the ends thereof through a pipe 21. The tray 5' immediately below the discharge of the pipe 21 has a flat upper surface without the ribs provided on the other trays of the column, and the opening 7 in the tray immediately above the tray 5' is preferably directly above the opening in the latter tray.

The firing of the combustion chambers 9 and 15 is so adjusted and regulated as to rectify continuously the mixture of zinc and cadmium entering the apparatus through the feed pipe 21. In this manner, the ascending vapor is progressively enriched in cadmium and the descending (refluxing) molten metal is progressively freed of cadmium. All but a cadmium-rich fraction of the vapor entering the dephlegmator 19 is condensed therein and is returned (refluxed) through the rectifying column for the further removal of cadmium therefrom. The cadmium-rich fraction of the vapor uncondensed in the dephlegmator escapes through the pipe 20 and is appropriately collected and recovered. The refluxing molten metal is progressively freed of cadmium in its downward passage through the rectifying column and the ultimately purified zinc metal flows into the sump 13 from which it is withdrawn at appropriate intervals through the tap hole 14.

Where the apparatus of the invention is used for the removal of lead or the like from zinc metal, the combustion chamber 9 may be replaced by appropriate heat insulation, and the zinc metal to be purified will be delivered to the base of the column in the form of vapor derived from a distillation retort or the like. In the operation of the apparatus for the elimination of lead, a smaller proportion of metal vapor will generally be condensed in the dephlegmator than when operating the apparatus for the elimination of cadmium. The purpose of the dephlegmator, in any case, is to condense a certain portion of the metal vapor at the top of the column, and various other equivalent expedients may be employed for this purpose, as for example by increasing the rate of heat dissipation at the top of the column by decreasing the amount of effective heat insulation at this point.

We claim:

1. An apparatus for purifying zinc metal comprising a vertically disposed column of spaced transverse baffles having openings therein, each opening being adapted to permit the continuous flow of metal vapor upwardly through the column and the continuous passage of molten metal downwardly from baffle to baffle, the openings in adjacent baffles being staggered to provide tortuous paths for the flow of vapor and passage of molten metal through the column, means for supplying to said column the zinc metal to be purified, means associated with said column for condensing a certain amount of metal vapor at the top of the column, means for withdrawing from the top of the column the uncondensed portion of the metal vapor, and means for withdrawing from the base of the column molten metal refluxed therethrough.

2. An apparatus for purifying zinc metal comprising a column of vertically spaced transverse baffles supported at their peripheries one above another and surrounded by heat insulation, each of said baffles having an opening therein adapted to permit the continuous flow of metal vapor upwardly through the column and the passage of molten metal downwardly from baffle to baffle and staggered with respect to the openings in the next adjacent baffles, means for supplying to said column the zinc metal to be purified, means for withdrawing metal vapor from the top of the column, and means for withdrawing refluxed molten metal from the base of the column.

3. An apparatus for purifying zinc metal comprising a column of horizontally positioned trays supported one above another at their peripheries and vertically spaced from one another over the greater portion of their horizontal surfaces, each of said trays having an opening therein adapted to permit the continuous flow of metal vapor upwardly through the column and the passage of molten metal downwardly from tray to tray and staggered with respect to the openings in the next adjacent upper and lower trays, means for supplying to said column the zinc metal to be purified, means associated with said column for condensing a certain amount of metal vapor at the top of the column, means for withdrawing from the top of the column the uncondensed portion of the metal vapor, and means for withdrawing from the base of the column molten metal refluxed therethrough.

4. An apparatus for purifying zinc metal comprising a column of horizontally positioned trays supported one above another at their peripheries and vertically spaced from one another over the greater portion of their horizontal surfaces, each of said trays having an opening therein adapted to permit the continuous flow of metal vapor upwardly through the column and the passage of molten metal downwardly from tray to tray and staggered with respect to the openings in the next adjacent upper and lower trays, each of said trays having a rib on the upper surface thereof for maintaining a shallow pool of molten metal on the tray, means for supplying to said column the zinc metal to be purified, means associated with said column for condensing a certain amount of metal vapor at the top of the column, means for withdrawing from the top of the column the uncondensed portion of the metal vapor, and means for withdrawing from the base of the column molten metal refluxed therethrough.

5. An apparatus for purifying zinc metal comprising a column of vertically spaced transverse baffles having openings therein, each opening being adapted to permit the continuous flow of metal vapor upwardly through the column and the passage of molten metal downwardly from baffle to baffle, each of said baffles having an opening therein staggered with respect to the openings in the next adjacent upper and lower baffles, each of said baffles being provided with damming means adapted to retain a pool of molten metal on the upper surface thereof, means for supplying to said column the zinc metal to be purified, means for withdrawing metal vapor from the top of the column, and means for withdrawing refluxed molten metal from the base of the column.

6. An apparatus for purifying zinc metal comprising a column of vertically spaced transverse baffles having openings therein to permit the flow of metal vapor upwardly through the column and the passage of molten metal downwardly from baffle to baffle, each of said baffles having an opening therein staggered with respect to the openings in the next adjacent upper and lower baffles, each of said baffles having on its upper surface a series of spaced ribs substantially parallel with the opening in the baffle, said ribs being of progressively increasing height with the lowest rib nearest the opening in the baffle, means for supplying to said column the zinc metal to be purified, means for withdrawing metal vapor from the top of the column, and means for withdrawing refluxed molten metal from the base of the column.

7. An apparatus for purifying zinc metal comprising a column of horizontally positioned trays supported one above another at their peripheries and vertically spaced from one another over the greater portion of their horizontal surfaces, each of said trays having an opening therein staggered with respect to the openings in the next adjacent upper and lower trays, each of said trays having on its upper surface a series of spaced ribs substantially parallel with the opening in the baffle, said ribs being of progressively increasing height with the lowest rib nearest the opening in the baffle, means for supplying to said column the zinc metal to be purified, means for withdrawing metal vapor from the top of the column, and means for withdrawing refluxed molten metal from the base of the column.

8. An apparatus for purifying zinc metal comprising a column of vertically spaced transverse baffles having openings therein to permit the flow of metal vapor upwardly through the column and the passage of molten metal downwardly from baffle to baffle, said baffles being rectangular in shape and the openings in adjacent baffles being at the opposite ends of the baffles, each of said baffles having on its upper surface a series of spaced ribs substantially parallel with the opening in the baffle, said ribs being of progressively increasing height with the lowest rib nearest the opening in the baffle, means for supplying to said column the zinc metal to be purified, means for withdrawing metal vapor from the top of the column, and means for withdrawing refluxed molten metal from the base of the column.

9. An apparatus for purifying zinc metal comprising a column of vertically spaced transverse baffles having openings therein, each opening being adapted to permit the continuous flow of metal vapor upwardly through the column and the passage of molten metal downwardly from baffle to baffle, means for supplying heat to the lower portion of said column, means for supplying to said column the zinc metal to be purified, means associated with said column for condensing a certain amount of metal vapor at the top of the column, means for withdrawing from the top of the column the uncondensed portion of the metal vapor, and means for withdrawing from the base of the column molten metal refluxed therethrough.

10. An apparatus for purifying zinc metal comprising a column of vertically spaced transverse baffles having openings therein, each opening being adapted to permit the continuous flow of metal vapor upwardly through the column and the passage of molten metal downwardly from baffle to baffle, the openings in adjacent baffles being staggered to provide tortuous paths for the flow of vapor and passage of molten metal through the column, means for supplying heat to the lower portion of said column, means for supplying the zinc metal to be purified to the column at a point intermediate its ends, means associated with the column for condensing a certain amount of metal vapor at the top of the column and the return through the column of the condensed molten metal, means for withdrawing from the top of the column the uncondensed portion of the metal vapor, and means for withdrawing from the base of the column molten metal refluxed therethrough.

PHILIP McLEAN GINDER.
WILLIS McGERALD PEIRCE.
ROBERT KERR WARING.